(12) United States Patent
Rousseau et al.

(10) Patent No.: US 8,215,948 B2
(45) Date of Patent: Jul. 10, 2012

(54) MOULDING DEVICE FOR THE PRODUCTION OF CONTAINERS MADE FROM A THERMOPLASTIC MATERIAL

(75) Inventors: Nicolas Rousseau, Octeville-sur-Mer (FR); Laurent Danel, Octeville-sur-Mer (DD)

(73) Assignee: Sidel Participations, Octeville-Su-Mer (FR)

( * ) Notice: Subject to any disclaimer, the term of this patent is extended or adjusted under 35 U.S.C. 154(b) by 326 days.

(21) Appl. No.: 12/528,716

(22) PCT Filed: Feb. 19, 2008

(86) PCT No.: PCT/FR2008/050274
§ 371 (c)(1),
(2), (4) Date: Nov. 6, 2009

(87) PCT Pub. No.: WO2008/113932
PCT Pub. Date: Sep. 25, 2008

(65) Prior Publication Data
US 2010/0047375 A1    Feb. 25, 2010

(30) Foreign Application Priority Data
Feb. 27, 2007    (FR) ...................................... 07 01396

(51) Int. Cl.
*B29C 49/56* (2006.01)
(52) U.S. Cl. ................. 425/541; 425/451.4; 425/DIG. 5
(58) Field of Classification Search ............... 425/451.4, 425/529, 541, DIG. 5
See application file for complete search history.

(56) References Cited

U.S. PATENT DOCUMENTS

| | | | | |
|---|---|---|---|---|
| 2,930,079 | A | * | 3/1960 | Parfrey ......................... 264/542 |
| 3,344,475 | A | * | 10/1967 | Gioe ............................. 425/330 |
| 3,685,943 | A | * | 8/1972 | Fischer ......................... 425/533 |
| 3,881,855 | A | * | 5/1975 | Farkas .......................... 425/533 |
| 3,994,655 | A | | 11/1976 | Edwards et al. |
| 4,764,328 | A | * | 8/1988 | Matz et al. .................... 264/248 |
| 6,390,802 | B1 | | 5/2002 | Zoppas |
| 6,726,873 | B1 | * | 4/2004 | Clarke .......................... 264/532 |
| 7,048,531 | B2 | | 5/2006 | Bianchini |
| 7,101,168 | B1 | | 9/2006 | Willemsen |
| 7,241,130 | B2 | | 7/2007 | Arakelyan |
| 7,384,261 | B2 | | 6/2008 | Mie et al. |

FOREIGN PATENT DOCUMENTS

| | | |
|---|---|---|
| FR | 1238421 A | 8/1960 |
| FR | 2 813 231 A1 | 3/2002 |
| FR | 2 841 495 A1 | 1/2004 |

(Continued)

*Primary Examiner* — Robert B Davis
(74) *Attorney, Agent, or Firm* — Sughrue Mion, PLLC

(57) ABSTRACT

The invention relates to a molding device for producing vessels by blowing or stretch-blowing from preforms of a heated thermoplastic material, the device including at least one mold that has at least two half-molds and a driving mechanism for moving the half-molds between an open position and a closed position. The two half-molds are hinged together for rotation about a hinge axis included in the junction plane and perpendicular to the axis of the molding cavity, the hinge axis being located under the half-molds, while a mechanism for locking the half-molds in their closed position are also provided. Each half-mold includes an outer surface area capable of abutment with an inner surface area of the mechanism for locking the half-molds in their closed position. The locking mechanism is in the form of a clamp capable of clamping the two half-molds in their closed position.

22 Claims, 7 Drawing Sheets

FOREIGN PATENT DOCUMENTS

| | | |
|---|---|---|
| FR | 2 863 930 A1 | 6/2005 |
| JP | 09-057838 A | 3/1997 |
| WO | 99/62692 A1 | 12/1999 |
| WO | 01/17753 A1 | 3/2001 |

* cited by examiner

MOULDING DEVICE FOR THE PRODUCTION OF CONTAINERS MADE FROM A THERMOPLASTIC MATERIAL

CROSS REFERENCE TO RELATED APPLICATION

This application is a National Stage of International Application No. PCT/FR2008/050274 filed Feb. 19, 2008, claiming priority based on French Patent Application No. 0701396, filed Feb. 27, 2007, the contents of all of which are incorporated herein by reference in their entirety.

The present invention relates generally to the field of moulding devices for the production of containers by blow-moulding or stretch-blow moulding, from preforms made from a heated thermoplastic material.

The invention relates in a general manner to moulding devices comprising at least one mould comprising at least two half moulds mutually displaceable between an open position in which they are separated from each other and a closed position in which they are tightly pressed against each other by respective mating faces defining a joint plane.

Two main types of moulding devices for the production of containers are known from the prior art.

A first moulding device relates to moulding devices with a swing-away type opening, i.e. with one half of the moulding device fixed on a rotary turning carousel, another detachable half pivoting in a downward movement radially outwards and an axially detachable mould base. However, due to the fact that the moveable half opens radially outwards, this moulding device involves a detrimental centrifugal force and requires relatively accurate adjustments in order to synchronize with the movement of the mould base.

A second type of moulding device relates to moulding devices of the clamshell type, in particular as described in the document FR 2 863 930, in which the moulding device comprises two half moulds with at least two respective edges with their respective mating faces that are arranged in the form of two mutually overlapping edges with respective opposite faces cooperating radially in the closed position of the mould, locking means being functionally associated with said overlapping edges in order to prevent the mould opening during the operation of blow-moulding the container. In other words, the two half moulds are mutually articulated in rotation about a shaft substantially parallel to one side of the joint plane and the locking means are provided on the opposite side of the mould to said shaft of the two half moulds.

In practice, each half mould comprises a mould holder to which is internally fixed a shell equipped with a mould half-impression, the joint plane being defined by the two shells pressing against each other in a closed position of the mould and the locking means are supported by the two mould holders.

Alternatively, as described in the document FR 2 841 495, it is also possible to provide moulding devices of the clamshell type comprising a mould in three parts, namely two half moulds for the body of the container and a mould base for the base of the container, the lower parts of the two half moulds and the upper part of the mould base comprising means that can be mutually nested in the closed position of the mould in order to provide axial rigidity of the mould in the presence of the blow pressure.

Although satisfactory from the point of view of the quality of the moulded container, the moulding devices known from the prior art have certain drawbacks that result in a significant restriction on the per-hour speed of production of moulded containers from these moulding devices.

Firstly, the kinematic chain from the transfer of the container to the moulding device, to the final recipient of the moulded container, is relatively long and involves the presence of many parts in series.

Moreover, control of the opening and closing of the moulds as well as actuation of the means of locking the mould requires the adjustment of many parts that are likely to have significant play.

Commonly, control of the opening and closing means as well as control of the means of locking and unlocking the moulding devices are carried out using a first double cam and roller assembly for control of the opening and closing and a second respective double cam and roller assembly for control of the locking and unlocking, the two assemblies being mechanically driven independently of one another, which is likely to quadruple the adjustment problems and lead to a loss of time during such adjustment. It would therefore be particularly beneficial to produce a moulding device for which the opening and closing operations as well as the locking and unlocking operations of the moulding device are carried out by a single control.

Moreover, the means of locking/unlocking the moulding devices, generally provided along a respective edge of the half moulds, occupy a volume that is likely to interfere with the transfer of the container once the latter is moulded.

Moreover, the locking/unlocking means currently used are often associated with locking fingers that require regular replacement due to wear.

It would also be particularly beneficial to produce a moulding device allowing for the locking and unlocking of the two half moulds to be facilitated.

In order to improve the quality of the moulded container, in particular in terms of visibility of the joint plane, it is necessary to provide a compensation chamber inside the mould, the mode of operation of which is synchronized with the locking and unlocking means, which causes additional adjustment difficulties.

In moulding devices of the clamshell type, a pressure compensation chamber is provided, in cooperation with a half mould, in order to guarantee tightness inside the mould. More precisely, the document FR 2 813 231 proposes a moulding device comprising, between two entities constituted by a mould element and its support, a compensation chamber into which a pressurized fluid is injected to move the mould element away from its support, the chamber being arranged between at least one of the mould elements and the associated support to push the mould element transversally from a retracted position to a forward position, towards the other element.

However, the compensation chamber does not allow for bottles larger than 1.5 litres to be compensated. Moreover, due to the fact that the compensation chamber is present only on one half mould, a misalignment can occur between the joint planes due to unequal rigidity between the two half moulds.

Similarly, the presence of this compensation chamber is relatively complex to set up and implement. It would therefore particularly beneficial to produce a moulding device that does not require a compensation chamber between the mould support and the mould block of a half mould.

Moreover, the thermal efficiency of the moulding devices according to the prior art is reduced due to the presence of many exchanges of heat flows between the at least two half moulds and the mould base, this efficiency being even further reduced in a heat resistant (HR) blow moulding configuration, as in this case the mould base is cooled and the at least two half moulds are heated.

Moulding devices as currently produced can only reach a maximum speed of 1800 bottles per hour, per moulding device, due to the existence of many dynamic errors, in particular problems of vibration and deformation of the cam and roller control systems, as well as problems of charging and wear of the moulding devices.

The adjustment tolerance is also very small, i.e. of the order of one tenth of a millimetre. It would therefore be particularly beneficial to produce a moulding device with larger adjustment tolerances.

The total height of the compensation chamber is also limited, and adjustments are difficult.

Moreover, making the fluidic connections is sometimes problematical due to the relatively large bulk of the moulding device.

Producing a moulding device for the production of containers by blow moulding or stretch-blow moulding of containers from preforms made from a heated thermoplastic material is known from document JP 09 057838, said device comprising at least one mould comprising at least two half moulds and driving means capable of displacing the half moulds between an open position in which they are separated from each other and a closed position in which they are tightly pressed against each other by respective mating faces defining a joint plane and in which they define a mould cavity, the two half moulds being hinged to each other rotatably about a hinge axis contained in the joint plane and perpendicular to the axis of the mould cavity, said hinge axis being below the two half moulds. However, this embodiment does not make it possible to guarantee perfect locking of the two half moulds at the time of blowing the container.

It would therefore be particularly beneficial to produce a moulding device making it possible in particular: to improve the kinematic chain; to improve the quality of the moulded container, i.e. to obtain a container in which the joint planes are completely or almost invisible; to improve the thermal efficiency of the moulding device, namely to reduce heat losses; to increase the mechanical speeds, i.e. to go beyond a production speed of 1800 bottles per hour per moulding device; to improve the adjustment tolerances of this device; to reduce the fluidic connections within the moulding device; to minimize the production costs; to be able to use materials that are lighter and more suitable for any blow-moulding station; to guarantee locking of the half moulds at the time of blowing the preform, as well as robotizing changes of the different mould parts, namely the changes of shells or mould elements in which the impressions of the container to be blow moulded are formed.

In order to respond to these different factors, the present invention relates to a moulding device for the production of containers by blow moulding or stretch-blow moulding from preforms made from a heated thermoplastic material, said device comprising at least one mould comprising at least two half moulds and driving means capable of moving the half moulds between an open position in which they are separated from each other and a closed position in which they are tightly pressed against each other by respective mating faces defining a joint plane and in which they define a mould cavity, the two half moulds being hinged to each other in rotation about a hinge axis contained in the joint plane and perpendicular to the axis of the mould cavity, said hinge axis being below the two half moulds, means of locking the two half moulds in their closed position also being provided, characterized in that each half mould has an outer surface zone capable of abutting against an inner surface zone of means of locking the two half moulds in a closed position, the outer surface zone of each half mould having a shape complementary to the inner surface zone of the locking means, such that, when the two surface zones are placed in contact against each other, the generation of two forces results therefrom, directed in opposing directions radially inwards on the two half moulds and in that said locking means are in the form of a collar capable of encircling the two half moulds in a closed position.

According to an advantageous embodiment, in order to limit the overall volume of the device according to the invention, the collar belongs to the means of driving the two half moulds.

Advantageously, the surface zones are substantially tapered.

According to an advantageous embodiment, the hinge axis is located below the two half moulds at a distance from them.

According to an advantageous embodiment, the driving means include a moving assembly that can be moved in a direction substantially parallel to the axis of the mould cavity and cooperating with the two half moulds so that, when the moving assembly is in a lower position, the two half moulds are in the open position and when the moving assembly is in an upper position, the two half moulds are in the closed position.

Advantageously, the driving means comprise means having cooperating cam followers and cams provided on the lateral faces of the two half moulds close to their respective mating faces and on the moving assembly.

According to a first embodiment of the cam-follower and cam means, two cam followers are mounted on two lateral faces belonging respectively to the two half moulds close to their respective mating faces and two cams are provided respectively on the moving assembly.

According to a second embodiment of the cam-follower and cam means, two cam followers are mounted on the moving assembly and two cams are provided on two lateral faces belonging respectively to the two half moulds close to their respective mating faces.

In order to limit the wear between the two surface zones, the surface zones are substantially tapered.

In order to control the displacement of the moving assembly in a direction substantially parallel to the axis of the mould cavity, a roller capable of cooperating with a cam is fixed on the moving assembly.

Advantageously, the moving assembly is capable of sliding on at least one guide rail provided fixed in relation to the hinge axis.

Preferably, the guide rail is provided on a support element of the hinge axis of the two half moulds.

According to an embodiment, the moving assembly is secured to at least one truck capable of sliding on the guide rail.

In order to facilitate the displacement of the moving assembly from the open position to the closed position of the two half moulds, the moulding device according to the invention comprises return means, preferably piston means, between the moving assembly and a support element of the hinge axis.

In order to facilitate the maintenance of the different parts constituting the two half moulds, each half mould comprises a lower part fixed to the hinge axis and an upper part comprising at least one shell holder and a shell in which the impression of the container to be moulded is at least partially formed.

Advantageously, the means of locking the two half moulds in a closed position are capable of resting on the upper parts of the two half moulds.

According to an embodiment, the moving assembly is a sleeve, at least partially surrounding the two half moulds.

For easy replacement of the locking means, a stop strip is fixed on the outer surface of the shell holder, the outer surface zone of the strip being capable of abutting against the inner surface zone of the means of locking the two half moulds.

In order to reduce the transfer time of a blown blank and to avoid the need to lift the blank once it has been blown, the moulding device comprises an axially moveable mould base coupled using securing means to one of the two half moulds.

In order to synchronize the axial sliding movement of the mould base with the opening/closing movement of the half moulds, the securing means comprise at least one roller, secured to the mould base, capable of cooperating with at least one cam fixed on one of the two half moulds, such that the mould base is in an upper position when the two half moulds are in their closed position and the mould base is in a lower position when the two half moulds are in their open position.

In order to allow for slight deformation and improved locking of the half moulds during the operation of blowing the blank, the stop strip is in tangential contact with the locking means in the upper position of the moving assembly when the blank is not being blown.

Advantageously, the stop strip is capable of being pressed against the inner surface of the locking means during the blowing of the blank.

The present invention will now be described using an example for illustration only that in no way limits the scope of the present invention and on the basis of the following drawings, in which:

FIG. 1 shows a perspective view of a moulding device 1 for the production of containers by blow-moulding or stretch-blow moulding from preforms made from a heated thermoplastic material.

In the remainder of the description, the terms vertical, horizontal, upper, lower, etc. are used with reference to the drawings, which show a wide-ranging arrangement of a moulding device. Nevertheless these terms are used purely for the sake of clarity of the description, and should not be interpreted as limitative of the invention.

Figure 1:
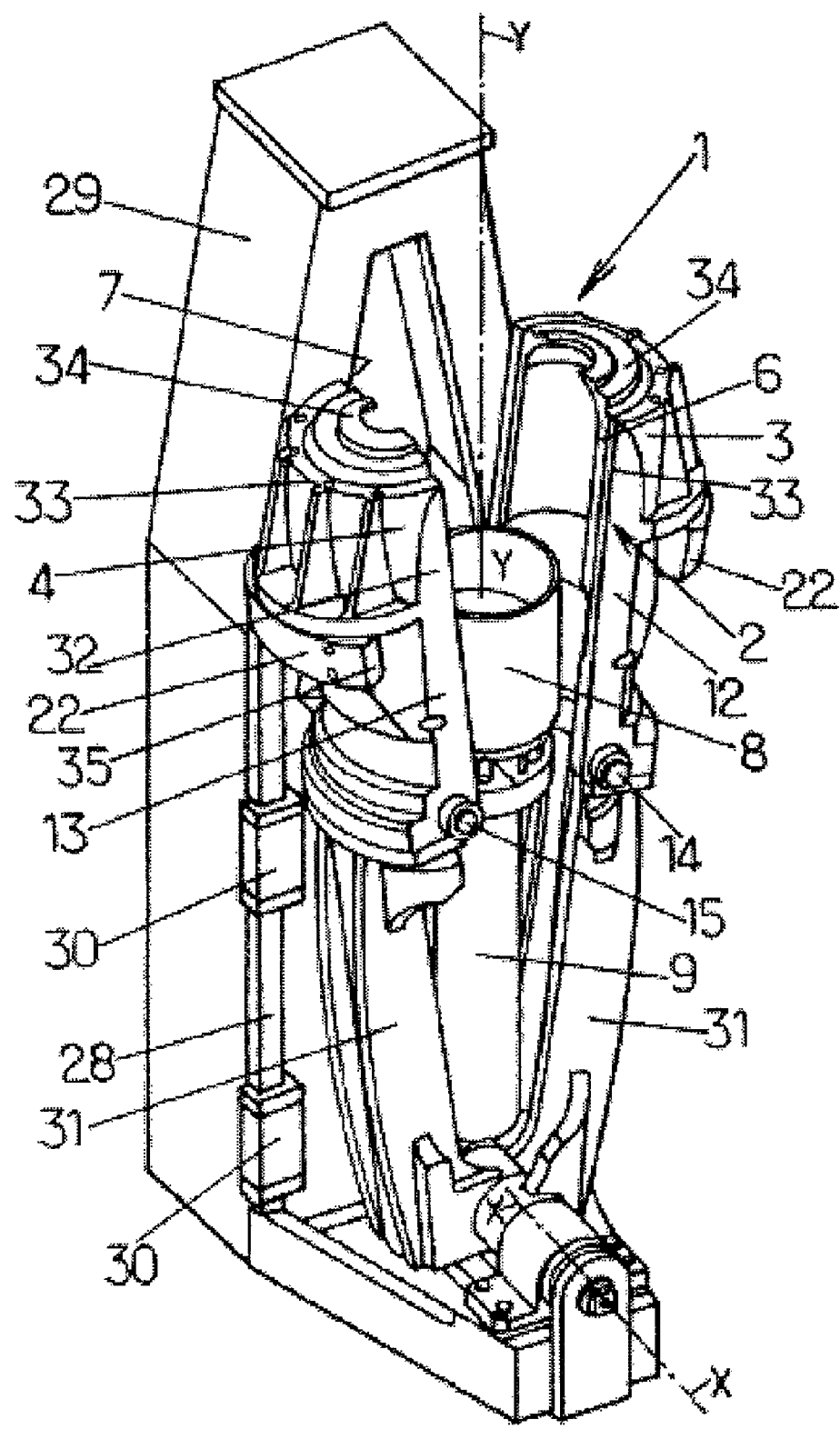
FIG. 1 is a perspective view of the moulding device according to the invention in the open position of the two half moulds, the means of driving the two half moulds not being shown, for the sake of clarity.
Figure 2:
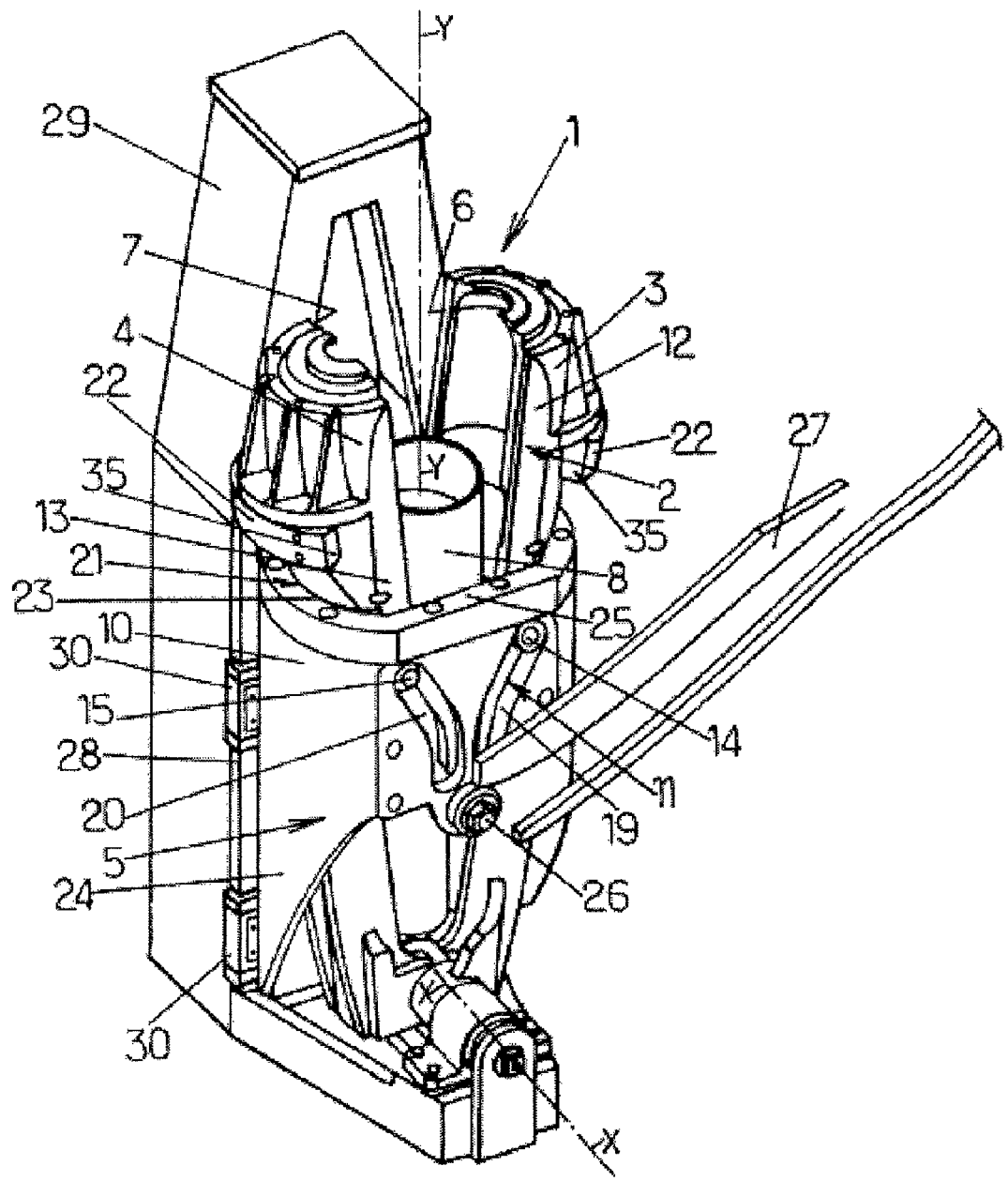
FIG. 2 is a perspective view of the moulding device according to the invention in its open position.
Figure 3:
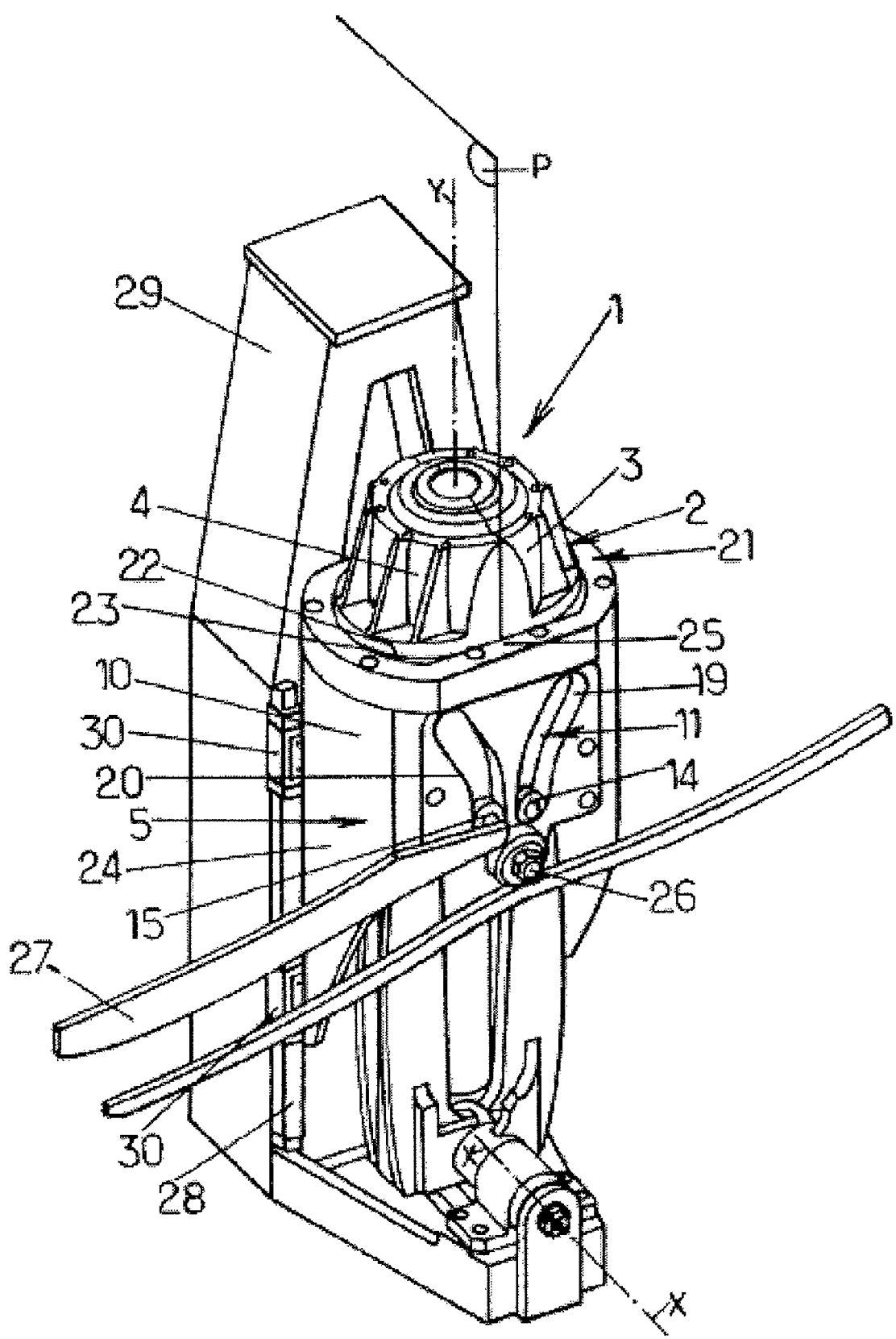
FIG. 3 is a perspective view of the moulding device according to the invention in its closed position.

The moulding device 1 comprises at least one mould 2 comprising at least two half moulds 3, 4 and driving means 5 (not shown in FIG. 1 for the sake of clarity, but shown in FIGS. 2, 3 and 7) capable of displacing the half moulds 3, 4 between an open position, shown in FIGS. 1 and 2, in which they are separated from each other, and a closed position, shown in FIG. 3, in which they are tightly pressed against each other by respective mating faces 6, 7 defining a joint plane P and in which they define a mould cavity.

More precisely, the two half moulds 3, 4 in their closed position define a mould cavity corresponding to the impression of the body of the blown blank.

The two half moulds 3, 4 are hinged to each other in rotation about a hinge axis X-X contained in the joint plane P and perpendicular to the axis of the mould cavity Y-Y, the hinge axis X-X being below the two half moulds 3, 4.

By "axis of the mould cavity" is understood the blow axis of the blow tube.

The hinge axis X-X is located below the two half moulds 3, 4 at a distance from the latter. In other words, the hinge axis X-X is located closer to floor level than are the two half moulds 3, 4. Alternatively, the hinge axis X-X can be provided directly passing through the two half moulds 3, 4.

The moulding device 1 comprises moreover a mould base 8 that is fixed and has a shape complementary to the two half moulds 3, 4, so that the two half moulds 3, 4 nest in the mould base 8 in a closed position, allowing a sealed mould cavity to be formed.

Figure 5:
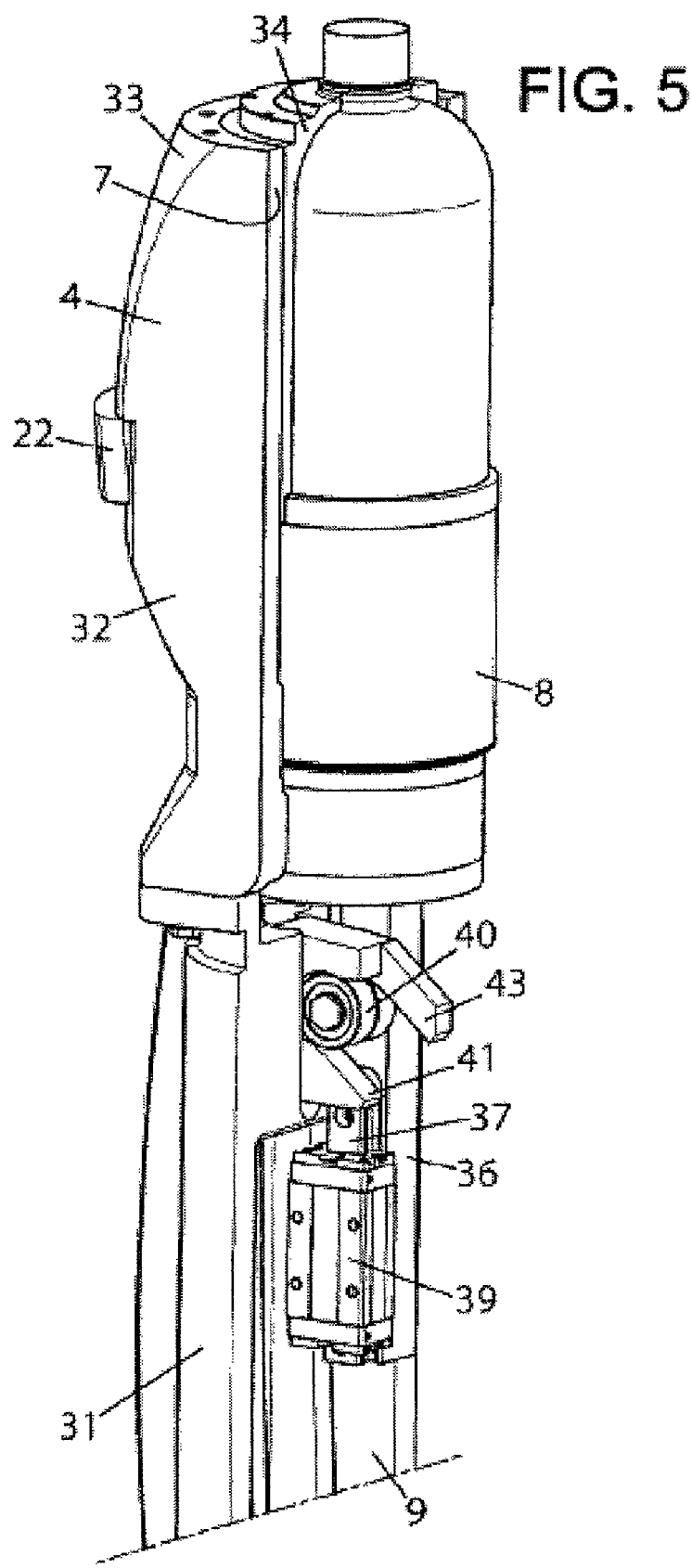
FIG. 5 is a partial perspective view of the securing means between the mould base shown in FIG. 4 and a half mould of the device according to the invention, in a closed position for blowing.

Preferably, the mould base 8 is provided secured on a fixed column 9 provided substantially perpendicular to the hinge axis X-X. However, it is also possible to provide an axially moveable mould base 8 capable of nesting in the two half moulds 3, 4 when they are in a closed position (see FIGS. 5 and 6).

The driving means 5 comprise a moving assembly 10 that can be displaced in a direction substantially parallel to the axis Y-Y of the mould cavity and cooperating with the two half moulds 3, 4 so that, when the moving assembly 10 is in a lower position, the two half moulds 3, 4 are in an open position and when the moving assembly 10 is in an upper position, the two half moulds 3, 4 are in a closed position.

The driving means 5 comprise means 11 having cooperating cam followers and cams provided on the lateral faces 12, 13 of the two half moulds 3, 4 close to their respective mating faces 6, 7 and on the moving assembly 10.

According to a first embodiment and as shown in the Figures, two cam followers 14, 15 are mounted on two lateral faces 12, 13 belonging respectively to the two half moulds 3, 4 close to their respective mating faces 6, 7 and two cams 19, 20 are provided respectively on the moving assembly 10.

According to a second embodiment (not shown in the Figures) and inversely in relation to the first embodiment, two cam followers are mounted on the moving assembly 10 and two cams are provided formed in the two lateral faces 12, 13 belonging respectively to the two half moulds 3, 4 close to their respective mating faces 6, 7.

The moulding device 1 has means 21 of locking the two half moulds 3, 4 in their closed position, each half mould 3, 4 having an outer surface zone 22 capable of abutting against an inner surface zone 23 of the means 21 of locking the two half moulds 3, 4 in a closed position, the outer surface zone 22 of each half mould 3, 4 having a shape complementary to the inner surface zone 23 of the locking means 21 so that, when the two surface zones 22, 23 are placed in contact against each other, the generation of two forces results therefrom, directed in opposing directions radially inwards on the two half moulds 3, 4, and preferably towards the axis Y-Y of the mould cavity, in order to implement the buttressing principle, as will be described in more detail below.

According to an embodiment, the surface zones 22, 23 are substantially tapered.

According to the embodiment shown in the Figures, the locking means 21 are incorporated in the driving means 5, i.e. the locking means 21 belong to the moving assembly 10, which has the form of a sleeve 24 capable of encircling at least partially the two half moulds 3, 4. However, alternatively, it is possible to provide for the locking means 21 to have any shape enabling the two half moulds 3, 4 to be pressed against each other, for example using piston-type means.

The locking means 21 have the form of a collar 25 belonging to the means 5 of driving the two half moulds 3, 4, i.e. to the moving assembly 10, and capable of surrounding the half moulds 3, 4 in a closed position.

A roller 26 capable of cooperating with a cam 27 is fixed on the moving assembly 10 so as to control the displacement of the moving assembly 10 in a direction substantially parallel to the axis Y-Y of the mould cavity.

Thus the moulding device 1 is shown in FIG. 2 with the two half moulds 3, 4 in an open position and the roller 26 in a lower position just before it enters the cam 27 capable of controlling the rise of the roller 26 into an upper position, as shown in FIG. 3, and corresponding to the closed position of the two half moulds 3, 4.

The moving assembly 10 is capable of sliding on at least one guide rail 28 provided fixed in relation to the axis Y-Y of the mould cavity formed in a support element or frame 29 capable of being fixed to a rotary carousel, thus allowing a plurality of moulding devices 1 to be located on the circumference of the carousel.

Preferably, the moving assembly 10 is secured to at least one truck 30 (preferably two trucks 30) capable of sliding on the guide rail 28.

Each half mould 3, 4 comprises a lower part 31 fixed to the hinge axis X-X and an upper part 32 comprising at least one shell holder 33 and a shell 34 in which the impression of the container to be moulded is at least partially formed, the locking means 5, preferably the collar 25, of the two half moulds 3, 4 in a closed position are capable of resting on the two upper parts 32 of the two half moulds 3, 4.

According to an embodiment, a stop strip 35 is fixed on the outer surface of the shell holder 33, the outer surface zone of the strip 35 being capable of abutting against the inner surface zone 23 of the means 5 of locking the two half moulds 3, 4.

The moulding device 1 according to the invention comprises return means, preferably piston means 44 as described in more detail below in relation to FIG. 7, between the moving assembly 10 and the element or frame 29 supporting the hinge axis X-X, by means of which is facilitated the upward displacement of the moving assembly 10 from the open position to the closed position of the two half moulds 3, 4.

Figure 4:
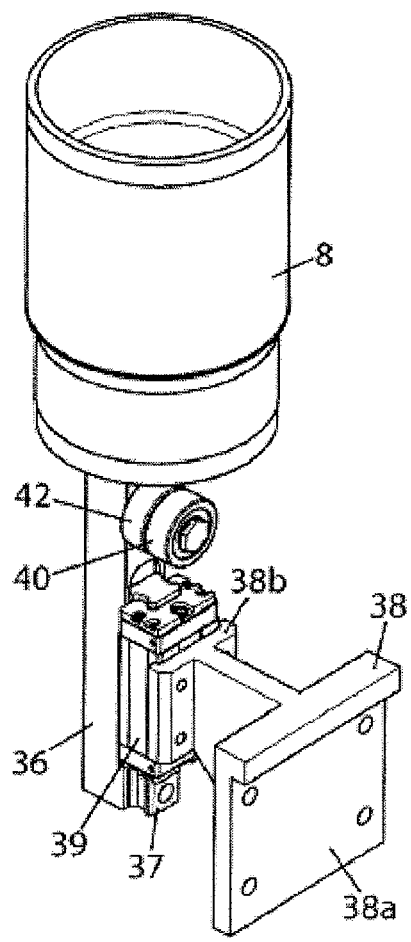
FIG. 4 is a perspective view of an embodiment of an axially moveable mould base capable of being incorporated into the moulding device according to the invention.
Figure 6:
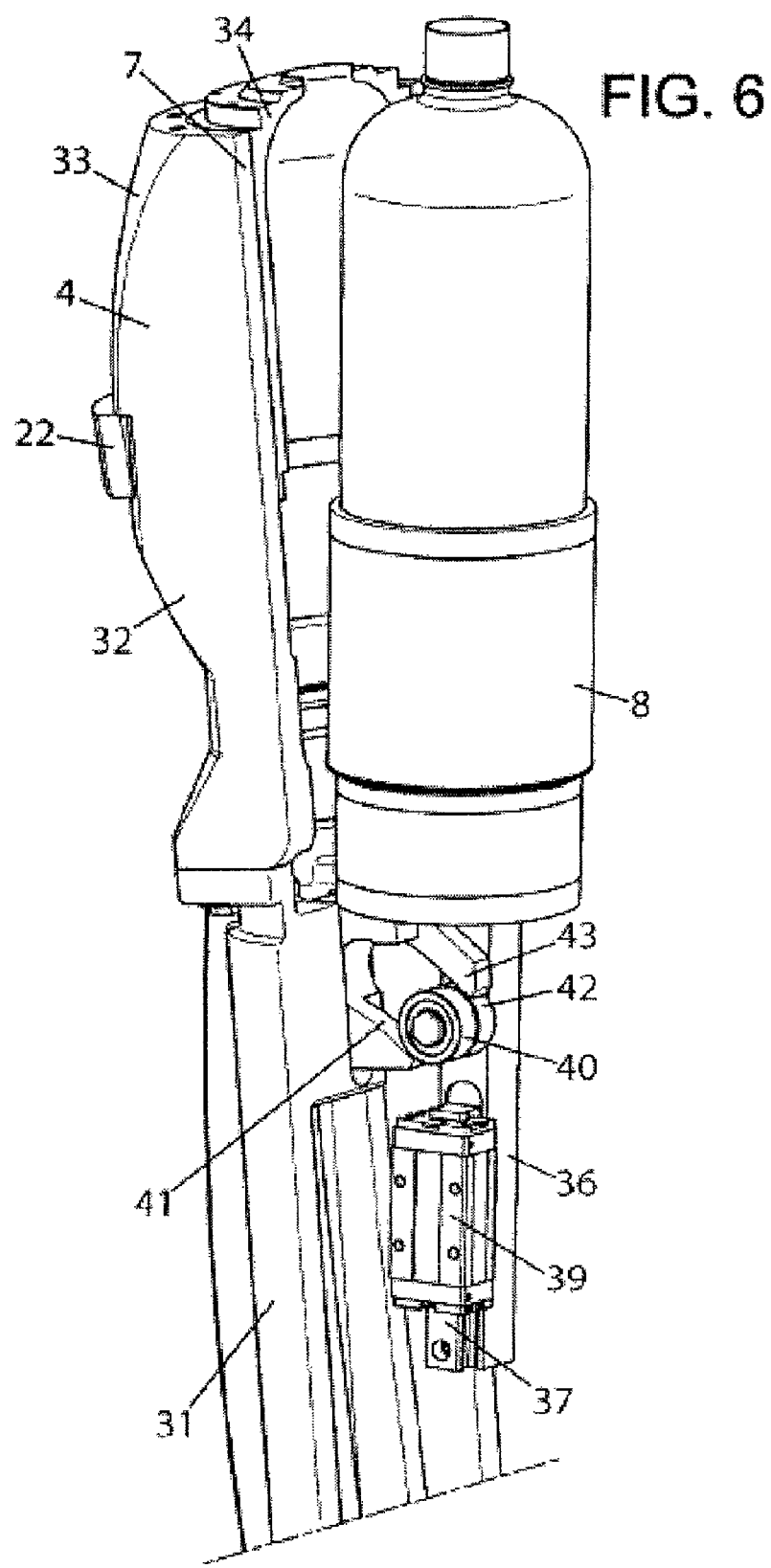
FIG. 6 is a partial perspective view of the securing means between the mould base shown in FIG. 4 and a half mould of the device according to the invention, in an open position for transfer of the blown blank.

FIG. 4 shows a partial perspective view of a mould base 8 provided to be axially moveable and secured by securing means, such as shown in FIG. 6, to a half mould 4 of the moulding device 1 according to the invention.

More precisely, a rod 36 is provided, starting from the mould base 8, preferably substantially coaxial with the axis of the mould cavity, and on which a guide rail 37 is fixed by any means known per se.

A holding element 38 is fixed to the frame 29 in the form of an H-shaped element with a first plate 38a fixed on the frame 29 and a second plate 38b on which is fixed a truck 39 capable of sliding on the guide rail 37 of the rod 36 of the mould base 8.

At least one roller 40 capable of cooperating with a cam 41 is provided fixed on the rod 36. Preferably, two rollers 40, 42, each cooperating with a cam 41, 43, are provided.

In one of the two half moulds 3, 4, there is provided at least one fixed cam 41, 43, preferably built into the half mould 3, 4, in particular into the lower part 31 of the half mould 3, 4, with a part of the cam 41, 43 projecting so as to cooperate with the rollers 40, 42.

The projecting parts of the cams 41, 43 are shaped such that in a closed position of the half moulds 3, 4, the mould base 8 is in an upper position (see FIG. 5) and the movement of opening the half moulds 3, 4 drives a downward axial movement of the mould base 8 (see FIG. 6).

Figure 7:
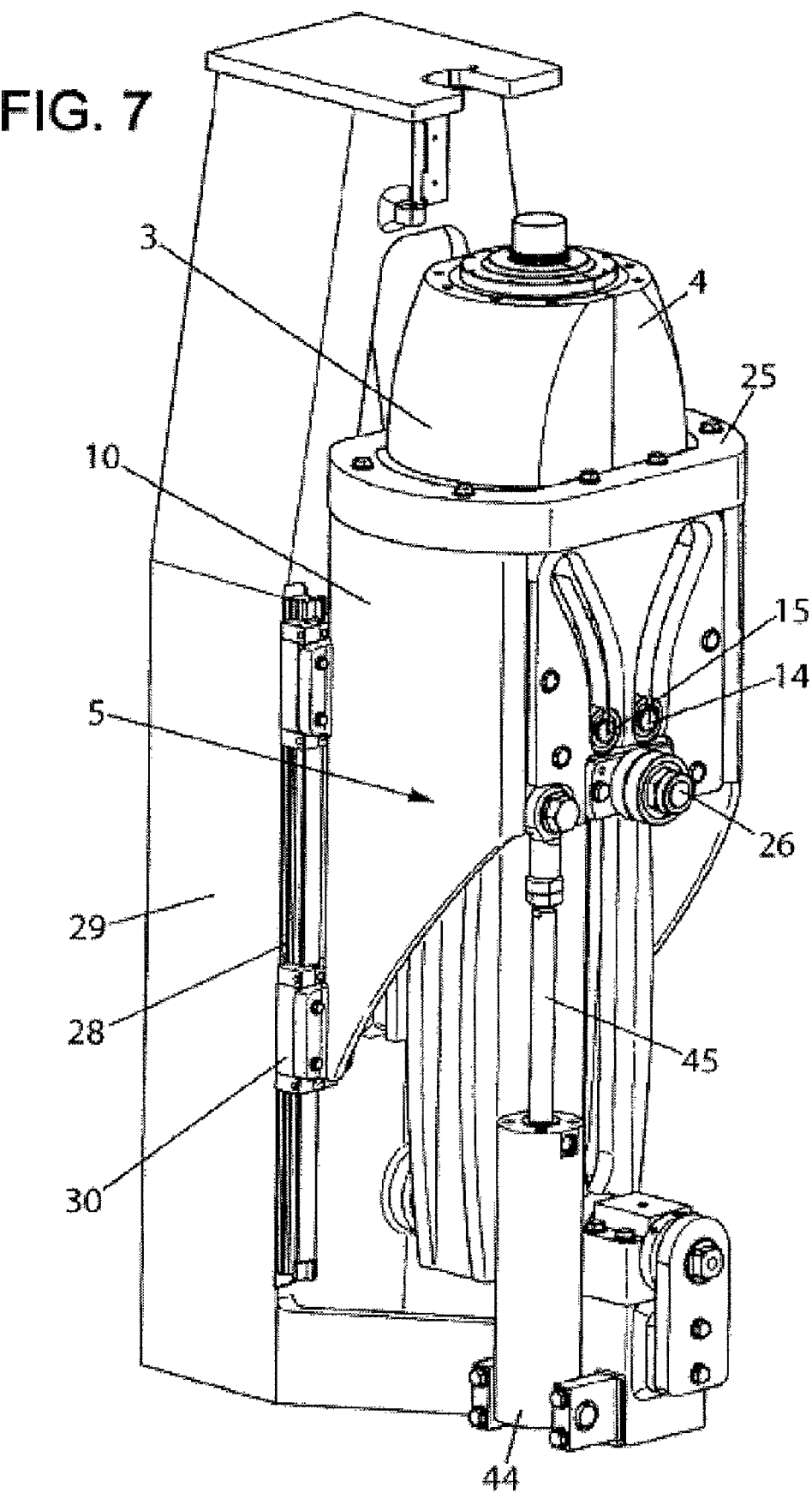
FIG. 7 is a perspective view of a particular embodiment of the moulding device according to the invention.

FIG. 7 is a perspective view of the moulding device 1 according to the invention in which a ram 44 is provided, the piston rod 45 of which is linked to the moving assembly 10 and the body of which is fixed on the frame 29.

Preferably, the ram 44 operates between two limit pressures with high pressure in the lower position of the moving assembly 10, the two half moulds 3, 4 then being in their open position, and low pressure in the upper position of the moving assembly 10, the two half moulds 3, 4 then being in their closed position.

More precisely, the lower chamber of the ram 44 is pressurised such that the moving assembly 10 tends to experience a thrust movement by the ram 44 via its rod 45.

In this way, the upward movement of the moving assembly 10 is facilitated when it passes from the lower position to the upper position, despite the mass of the moving assembly 10.

Of course, it is possible to provide more than a single ram between the moving assembly 10 and the frame 29, or to provide spring means.

Figure 8:
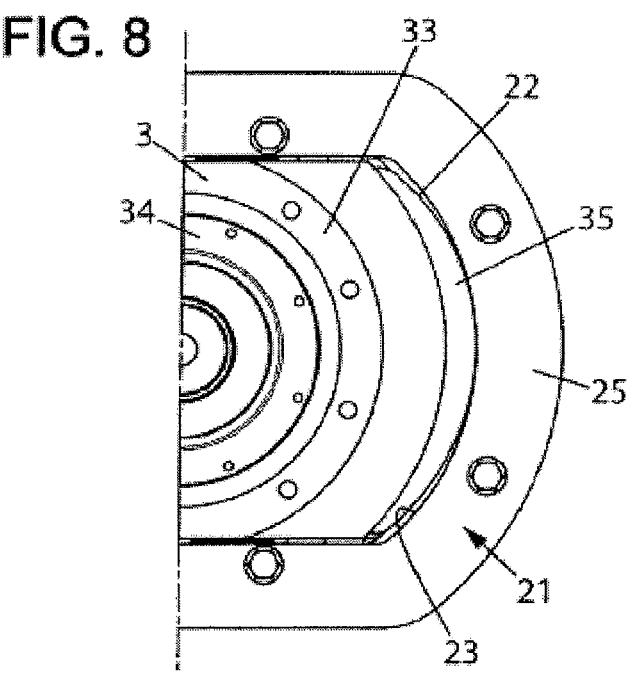
FIG. 8 is a top view of a half mould in a closed position and locked by locking means.

FIG. 8 shows a top view of a half mould in a closed position and locked by the locking means 21.

As can be seen from FIG. 8, the stop strip 35 is in tangential contact with the locking means 21 in the upper position of the moving assembly 10, i.e. in a closed position of the two half moulds, but only when the blank is not being blown, the stop strip 35 being capable of being pressed against the inner surface 23 of the locking means 21 during blowing of the blank.

The invention claimed is:

1. A moulding device for the production of containers by blow moulding or stretch-blow moulding from preforms made from a heated thermoplastic material, said device comprising at least one mould comprising at least two half moulds and driving means capable of displacing said half moulds between an open position in which said half moulds are separated from each other and a closed position in which said half moulds are tightly pressed against each other by respective mating faces defining a joint plane and in which said half moulds define a mould cavity, said two half moulds being hinged to each other in rotation about a hinge axis contained in said joint plane and perpendicular to an axis of said mould cavity, said hinge axis being below said two half moulds, means of locking said two half moulds in said closed position also being provided, each half mould having an outer surface zone capable of abutting against an inner surface zone of said means of locking said two half moulds in said closed position, said outer surface zone of each half mould having a shape complementary to said inner surface zone of said locking means, such that, when said two surface zones are placed in contact against each other, the generation of two forces results therefrom, directed in opposing directions radially inwards on said two half moulds, and said locking means having the form of a collar capable of encircling said two half moulds in a closed position, wherein said driving means comprise a moving assembly capable of displacement in a direction substantially parallel to said axis of said mould cavity and cooperating with said two half moulds so that, when said moving assembly is in the lower position, said two half moulds are in an open position, and that when said moving assembly is in the upper position, said two half moulds are in a closed position and in that said collar belongs to said means of driving said two half moulds;

the moulding device further comprising a mould base, wherein said mould base is axially moveable and is coupled using securing means to one of said two half moulds.

2. A moulding device according to claim 1, wherein said surface zones are substantially tapered.

3. A moulding device according to claim 1, wherein said hinge axis is located below said two half moulds at a distance from them.

4. A moulding device according to claim 1, wherein said driving means comprise means having cooperating cam followers and cams provided on lateral faces of said two half moulds, close to said respective mating faces and on said moving assembly.

5. A moulding device according to claim 4, wherein said driving means comprise two cam followers mounted on two lateral faces belonging respectively to said two half moulds close to said respective mating faces and two cams respectively provided on said moving assembly.

6. A moulding device according to claim 4, wherein said driving means comprise two cam followers mounted on said moving assembly and two cams provided on two lateral faces belonging respectively to said two half moulds close to their respective mating faces.

7. A moulding device according to claim 1, wherein said driving means comprise a roller capable of cooperating with a cam and which is fixed on said moving assembly so as to control said displacement of said moving assembly in a direction substantially parallel to said axis of said mould cavity.

8. A moulding device according to claim 1, wherein said driving means comprise at least one guide rail that is provided fixed in relation to said hinge axis and on which said moving assembly is capable of sliding.

9. A moulding device according to claim 8, wherein said guide rail is provided on a support element of said hinge axis of said two half moulds.

10. A moulding device according to claim 9, wherein said driving means comprise at least one truck capable of sliding on said guide rail and to which said moving assembly is secured.

11. A moulding device according to claim 1 comprising return means, between said moving assembly and a support element of said hinge axis, by means of which a displacement of said moving assembly is facilitated from said open position to said closed position of said two half moulds.

12. A moulding device according to claim 1, wherein each said half mould comprises a lower part fixed to said hinge axis and an upper part comprising at least one shell holder and one shell in which an impression of a container to be moulded is at least partially formed.

13. A moulding device according to claim 12, wherein said means of locking said two half moulds in a closed position are capable of resting on said upper parts of said two half moulds.

14. A moulding device according to claim 1, wherein said moving assembly is a sleeve at least partially encircling said two half moulds.

15. A moulding device according to claim 12, wherein a stop strip is fixed on an outer surface of said shell holder, an outer surface zone of said strip being capable of abutting against said inner surface zone of said means of locking said two half moulds.

16. A moulding device according to claim 1, wherein said securing means comprise at least one roller that is secured to said mould base and that is capable of cooperating with at least one cam fixed on one of said two half moulds, such that said mould base is in an upper position when said two half moulds are in their closed position and said mould base is in a lower position when said two half moulds are in their open position.

17. A moulding device according to claim 15, wherein said stop strip is in tangential contact with said locking means in said upper position of said moving assembly when a blank is not being blown.

18. A moulding device according to claim 15, wherein said stop strip is capable of being pressed against an inside surface of said locking means during blowing of a blank.

19. A moulding device for the production of containers by blow moulding or stretch-blow moulding from preforms made from a heated thermoplastic material, said device comprising at least one mould comprising at least two half moulds and driving means capable of displacing said half moulds between an open position in which said half moulds are separated from each other and a closed position in which said half moulds are tightly pressed against each other by respective mating faces defining a joint plane and in which said half moulds define a mould cavity, said two half moulds being hinged to each other in rotation about a hinge axis contained in said joint plane and perpendicular to an axis of said mould cavity, said hinge axis being below said two half moulds, means of locking said two half moulds in said closed position also being provided, each half mould having an outer surface zone capable of abutting against an inner surface zone of said means of locking said two half moulds in said closed position, said outer surface zone of each half mould having a shape complementary to said inner surface zone of said locking means, such that, when said two surface zones are placed in contact against each other, the generation of two forces results therefrom, directed in opposing directions radially inwards on said two half moulds, and said locking means having the form of a collar capable of encircling said two half moulds in a closed position, wherein said driving means comprise a moving assembly capable of displacement in a direction substantially parallel to said axis of said mould cavity and cooperating with said two half moulds so that, when said moving assembly is in the lower position, said two half moulds are in an open position, and that when said moving assembly is in the upper position, said two half moulds are in a closed position and in that said collar belongs to said means of driving said two half moulds;

wherein said driving means comprise means having cooperating cam followers and cams provided on lateral faces of said two half moulds, close to said respective mating faces and on said moving assembly.

20. A moulding device for the production of containers by blow moulding or stretch-blow moulding from preforms made from a heated thermoplastic material, said device comprising at least one mould comprising at least two half moulds and driving means capable of displacing said half moulds between an open position in which said half moulds are separated from each other and a closed position in which said half moulds are tightly pressed against each other by respective mating faces defining a joint plane and in which said half moulds define a mould cavity, said two half moulds being hinged to each other in rotation about a hinge axis contained in said joint plane and perpendicular to an axis of said mould cavity, said hinge axis being below said two half moulds, means of locking said two half moulds in said closed position also being provided, each half mould having an outer surface zone capable of abutting against an inner surface zone of said means of locking said two half moulds in said closed position, said outer surface zone of each half mould having a shape complementary to said inner surface zone of said locking means, such that, when said two surface zones are placed in contact against each other, the generation of two forces results therefrom, directed in opposing directions radially inwards on said two half moulds, and said locking means having the form of a collar capable of encircling said two half moulds in a closed position, wherein said driving means comprise a moving assembly capable of displacement in a direction substantially parallel to said axis of said mould cavity and cooperating with said two half moulds so that, when said moving assembly is in the lower position, said two half moulds are in an open position, and that when said moving assembly is in the upper position, said two half moulds are in a closed position and in that said collar belongs to said means of driving said two half moulds;

wherein said driving means comprise a roller capable of cooperating with a cam and which is fixed on said moving assembly so as to control said displacement of said moving assembly in a direction substantially parallel to said axis of said mould cavity.

21. A moulding device for the production of containers by blow moulding or stretch-blow moulding from preforms made from a heated thermoplastic material, said device comprising:

a mould comprising two half moulds;

a cam and follower assembly configured to displace the half moulds between an open position in which the half moulds are separated from each other and a closed position in which the half moulds are pressed against each other by respective mating faces, the two half moulds define a mould cavity, and the two half moulds hinged about a hinge axis, said hinge axis below the two half moulds;

a locking device having a collar that locks the two half moulds in the closed position, each half mould having an outer surface configured to abut an inner surface zone of the locking device in the closed position, the outer surface of each half mould having a shape complementary to the inner surface of the locking device, such that, when the two surfaces are in contact against each other, two forces are generated on the two half moulds, the two forces directed in opposing directions and radially inwards, wherein the collar is configured to encircle the two half moulds in the closed position;

the cam and follower assembly also configured to displace the collar between a lower position and an upper position in a direction substantially parallel to a longitudinal axis of the mould cavity and cooperating with the two half moulds so that when the collar is in the lower position, the two half moulds are in the open position, and when the collar is in the upper position, the two half moulds are in the closed position; and the moulding device further comprising a mould base axially moveable and coupled to one of the two half moulds.

22. A moulding device for the production of containers by blow moulding or stretch-blow moulding from preforms made from a heated thermoplastic material, said device comprising:

a mould comprising two half moulds;

a cam and follower assembly configured to relatively displace the two half moulds between an open position in which the half moulds are separated from each other and a closed position in which the two half moulds are pressed against each other by respective mating faces, the two half moulds define a mould cavity, and the two half moulds hinged about a hinge axis, said hinge axis below the two half moulds;

a locking device having a sleeve and collar that locks the two half moulds in the closed position, each half mould having an outer surface configured to abut an inner surface zone of the locking device in the closed position, the outer surface of each half mould having a shape complementary to the inner surface of the locking device, such that, when the two surfaces are in contact against each other, two forces are generated on the two half moulds, the two forces directed in opposing directions and radially inwards, wherein the collar is configured to encircle the two half moulds in the closed position;

the cam and follower assembly also configured to displace the collar between a lower position and an upper position in a direction substantially parallel to a longitudinal axis of the mould cavity and cooperating with the two half moulds so that when the collar is in the lower position, the two half moulds are in the open position, and when the collar is in the upper position, the two half moulds are in the closed position;

the cam and follower assembly comprising cam followers provided on one of the two half moulds and the sleeve and cams provided on the other one of the two half moulds and the sleeve.

* * * * *